United States Patent [19]

Kinsell et al.

[11] 4,003,212
[45] Jan. 18, 1977

[54] AIR CONDITIONING SYSTEM FOR AIRCRAFT

[75] Inventors: Robert C. Kinsell, Los Angeles; James C. Noe, Canoga Park; Carl D. Campbell, Cerritos, all of Calif.

[73] Assignee: The Garrett Corporation, Los Angeles, Calif.

[22] Filed: Aug. 29, 1975

[21] Appl. No.: 609,129

[52] U.S. Cl. .................................. 62/91; 62/7; 62/244; 62/309; 62/323
[51] Int. Cl.² ................. F25D 17/06; F25D 17/04; B60H 3/04; F25B 27/00
[58] Field of Search ............... 62/7, 121, 309, 86, 62/91, 118, 323, 239, 244

[56] References Cited
UNITED STATES PATENTS

| | | | |
|---|---|---|---|
| 2,136,527 | 11/1938 | Stelzer | 62/7 |
| 2,249,621 | 7/1941 | Schlumbohm | 62/121 |
| 2,378,692 | 6/1945 | Farago | 62/323 |
| 2,403,831 | 7/1946 | Sharples | 62/7 |
| 2,477,931 | 8/1949 | King | 62/309 |
| 2,784,571 | 3/1957 | Schelp | 62/309 |
| 3,077,745 | 2/1963 | Grantham et al. | 62/323 |
| 3,170,302 | 2/1965 | Potito | 62/7 |
| 3,648,480 | 3/1972 | Watts | 62/323 |

*Primary Examiner*—Lloyd L. King
*Attorney, Agent, or Firm*—Joel D. Talcott; Albert J. Miller

[57] ABSTRACT

After the intake air for a vehicle's internal combustion type propulsion engine has been throttled down to about the intake manifold pressure, water is sprayed into the air. This air passes through the primary side of an air-to-air heat exchanger so that the vaporization of the water will remove heat from the air passing through the secondary side of the heat exchanger. This cooled air is circulated through an enclosure of the vehicle to provide low cost, low power cooling for the occupants thereof.

8 Claims, 1 Drawing Figure

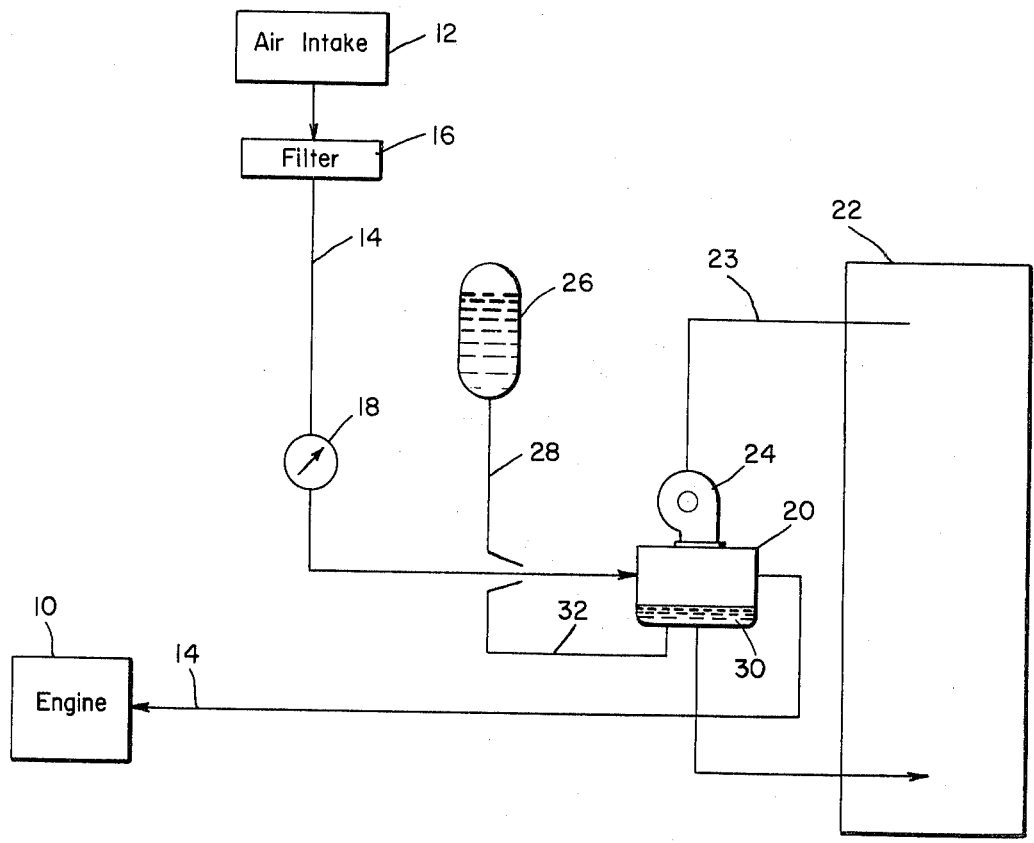

AIR CONDITIONING SYSTEM FOR AIRCRAFT

This invention relates to air conditioning systems and, more particularly, to an air conditioning system which provides efficient, low cost evaporative cooling for a vehicle powered by an internal combustion engine.

Prior art vehicle air conditioning systems have generally required the use of compressors and other expensive equipment. The closed loop vapor cycle air conditioning systems which are commonly used in automobiles have the added drawback of requiring substantial amounts of power for their operation. Air cycle air conditioning systems have been used extensively in turbine driven aircraft wherein the engine includes a compressor which serves as a source of high pressure air. However, this type of air conditioning system had been deemed unsuitable for use in vehicles powered by a reciprocating piston engine. While our patent application, Ser. No. 609,130, filed Aug. 29, 1975, filed concurrently herewith, discloses an air cycle air conditioning system with low power requirements which is suitable for use with a reciprocating piston engine, this system still requires the use of a turbocompressor which may, due to factors such as weight or cost, be undesirable in certain applications.

Evaporative cooling systems have been utilized occasionally in vehicles to provide cooling therein. In these systems, ambient air is drawn in from the outside so that water may be evaporated therein. As is well known, the evaporation of the water removes heat from the air so that cooling can be effected with a minimal use of power and at a substantially nominal cost. However, such systems have never been able to provide the amount of cooling necessary for vehicles because the normal evaporative rate of water into air is insufficient to remove the amount of heat from the vehicle that is added by contact with outside heated air and by radiation from the sun.

In accordance with this invention, engine inlet air is passed through a throttling valve so that its pressure is reduced in a well known manner to a value substantially equal to the pressure at the intake manifold of the engine. Water is sprayed into this reduced pressure air and the air is passed through one side of a heat exchanger. Due to the low pressure of the air, its ability to absorb water vapor is greatly enhanced over that of air at atmospheric pressure and thus the mass of water which can be evaporated in the heat exchanger is substantially increased. As a result, the quantity of heat which can be removed from the air passing through the secondary side of the heat exchanger is correspondingly greater. The low pressure air from the primary side of the heat exchanger is passed to the engine and the air from secondary side of the heat exchanger is circulated through an enclosure for cooling its occupants.

The air conditioning system of this invention will be more readily understood when the following specification is read in conjunction with the drawing which is a generally schematic view of an air conditioning system in accordance with this invention.

Referring now to the drawing, the air conditioning system of this invention is designed for use in conjunction with a propulsion engine 10 of the internal combustion type to which air is provided from an air intake 12. The air is passed through a conduit or other suitable air directing means 14 and may be passed through a suitable air filter 16 before reaching a throttling valve 18. The throttling valve 18 controls the amount of air flowing to the intake manifold of the engine 10 in a well known manner. Before interacting with the throttling valve 18, air in the air directing means 14 is at a pressure substantially equal to ambient atmospheric pressure. After interacting with the throttling valve 18, the pressure of the air is reduced to about that of the intake manifold of the engine 10. As is well known, throttling valve 18 is adjustable to increase or restrict the flow of air to the engine 10 and is controlled by the operator of the vehicle in accordance with the power requirements for the engine.

After interacting with the throttling valve 18, the air is directed by the air directing means 14 through one side of an air-to-air heat exchanger 20. Through the other side of the heat exchanger 20 is circulated air from an enclosure 22, which air is to be cooled in the heat exchanger. The enclosure 22 may be the cabin of an airplane or the interior of an automobile or any other enclosed space for which cooling is desired. The air is circulated from the enclosure 22 through the heat exchanger 20 and conduits 23 by a blower 24. The heat exchanger and blower may be mounted either inside the enclosure 22, in the engine compartment or in any other suitable location.

To provide the cooling within the heat exchanger 20, water is sprayed into the air in the conduit 14, preferably just before the air enters the heat exchanger 20. This water may be stored in a water tank 26 and transported to the conduit 14 through a pipe 28. Additional water for evaporative cooling may be obtained from a water trap 30 in the secondary side of the heat exchanger 20. As is well known, when moisture laden air from the enclosure 22 is cooled in the heat exchanger, the water condenses and may be collected. This water is passed through a pipe 32 to be sprayed into the conduit 14 along with the water from the tank 26.

As previously stated, only limited cooling could be provided by spraying water into ambient air in the manner known in the prior art. However, in the air conditioning system of this invention, the water is sprayed into air which has been substantially reduced in pressure by interaction with the throttling valve 18. This reduction in air pressure greatly increases the capability of the air to hold water vapor.

It is well known that the vaporization of water utilizes substantial quantities of heat. When the moisture laden air in the conduit 14 reaches the heat exchanger 20, it thermally interacts with the hot air in the secondary side. Heat passes to the cooler air in the primary side, which heat is used to vaporize water as well as increase the temperature of the air in the primary side. Because the heat needed to vaporize water is substantial when compared with the heat needed to be removed from air to lower its temperature, the increase in vapor holding capacity of the air at its reduced pressure permits a realistic cooling capacity to be attained. Thus the air from the enclosure 22 experiences a significant reduction in its temperature. The air is also dried by the condensation of water which may be collected in the water trap 30 as previously described. The cooled, dried air is returned to the enclosure 22, propelled by the blower 24, so that cooling is provided for the occupants of the enclosure. The low pressure air passed through the primary side of the heat exchanger 20 is then directed by the conduit system 14 to the engine 10 to be mixed with fuel for combustion.

It should be noted that while water has been described as the liquid to be vaporized in the heat exchanger, other liquids or mixtures of other liquids and water could be used. For example, a fluid desirable to enhance the efficiency of operation of the engine 10 may serve a dual purpose by being stored in the tank 26 and fed to the engine with the air after being utilized for cooling of the vehicle enclosure.

We claim:

1. A method of cooling an enclosure of a vehicle having a propulsion engine intake means for providing air for an engine, and throttling means for reducing the pressure of the air said method comprising the steps of introducing a liquid into the reduced pressure air, passing the air and liquid through one side of a heat exchanger for absorption of heat by vaporization of the liquid, circulating air from the enclosure through another side of the heat exchanger for cooling, condensing liquid in said other side of the heat exchanger, and transporting said condensed liquid for introduction into said reduced pressure air.

2. In combination:
a vehicle having an enclosure and a propulsion engine;
intake means for providing air for combustion in the engine;
air directing means for transporting the air to an intake manifold of said engine;
throttling means in the air directing means for reducing the pressure of the air;
heat exchanger means;
means for circulating air from the enclosure through one side of the heat exchanger means to condense liquid from the air and cool the enclosure;
means interposed in another side of the heat exchanger means in the air directing means for passage of liquid and reduced pressure air therethrough to withdraw heat from the heat exchanger by vaporization of the liquid; and
liquid introducing means for transporting said condensed liquid for introduction into the reduced pressure air in the air directing means.

3. The combination of claim 2 wherein the liquid is water.

4. The combination of claim 2 wherein said liquid introducing means includes a tank for holding a supply of said liquid and means for transporting said liquid from the tank for spraying into said air directing means.

5. The combination of claim 2 wherein said liquid is sprayed into said reduced pressure air.

6. An air conditioning system for cooling an enclosure of a vehicle having a propulsion engine, an air intake and throttling means for reducing the pressure of the intake air, said system comprising a heat exchanger, means for circulating air from the enclosure through one side of the heat exchanger, means for directing air from the air intake means, through the throttling means and another side of the heat exchanger to an intake manifold of the engine, and means for introducing condensed liquid from said one side of the heat exchanger into the reduced pressure air in the air directing means upstream of the heat exchanger for absorbing heat by vaporization in the heat exchanger.

7. The air conditioning system of claim 6 wherein said liquid introducing means includes a tank for holding a supply of said liquid and means for transporting said liquid from the tank for spraying into said air directing means.

8. An air conditioning system for cooling the passenger compartment of an aircraft having an internal combustion engine, an air intake for drawing ambient air for transport to the engine through air directing means, and a throttling valve interposed in the air directing means for reducing the pressure of the air, said system comprising a heat exchanger having a primary side and a secondary side, means for circulating air from the passenger compartment through the secondary side of the heat exchanger for cooling the air and condensing moisture, a container of liquid, liquid introducing means for transporting the liquid from the container and moisture from the secondary side of the heat exchanger to the air directing means and introducing the liquid and condensed moisture into the reduced pressure air downstream of the throttling valve, and means interposing the primary side of the heat exchanger in the air directing means downstream of the liquid introducing means for vaporizing the liquid with heat removed from the air in the secondary side.

* * * * *